Jan. 17, 1961 A. G. STEINMAYER 2,968,778
THREE-LEGGED MAGNETIC CORE
Filed Oct. 29, 1959
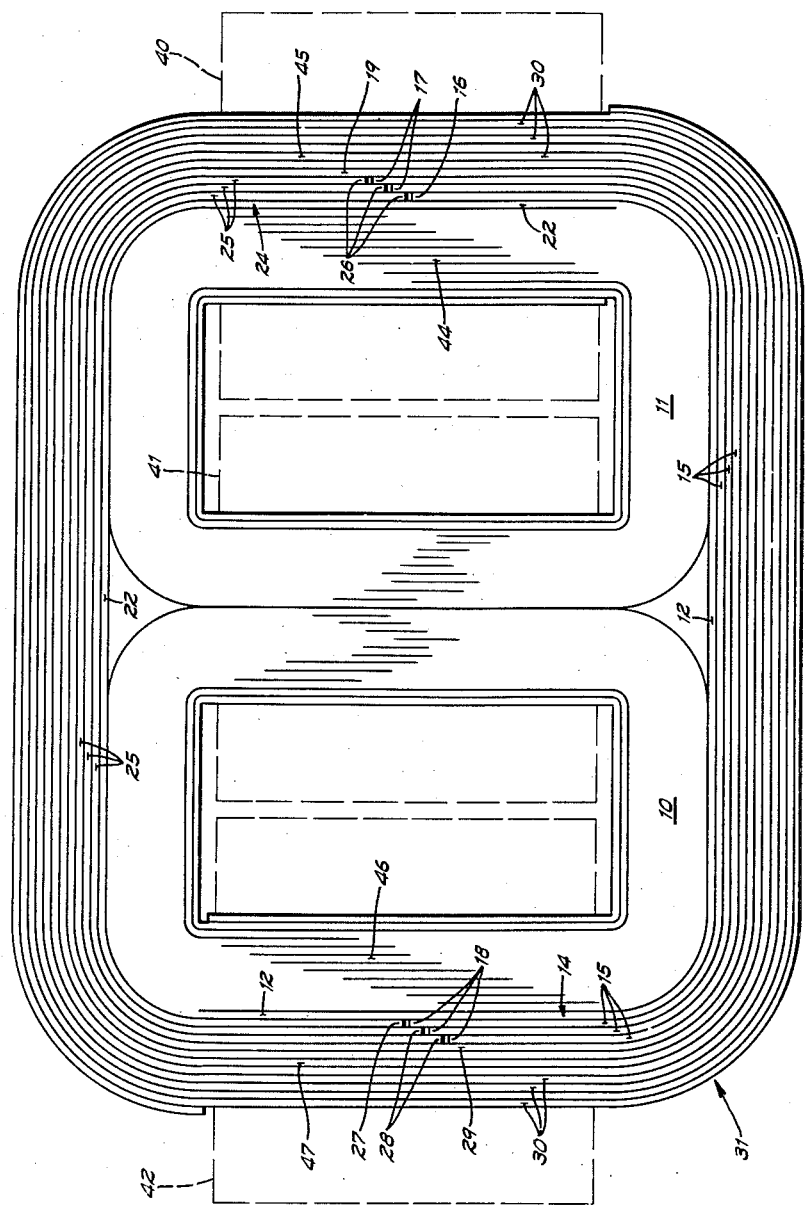
INVENTOR.
Alwin G. Steinmayer
BY
Lee H. Kaiser
Attorney United States Patent Office 2,968,778
Patented Jan. 17, 1961

2,968,778

THREE-LEGGED MAGNETIC CORE

Alwin G. Steinmayer, Milwaukee, Wis., assignor to McGraw-Edison Company, Milwaukee, Wis., a corporation of Delaware Filed Oct. 29, 1959, Ser. No. 849,548

2 Claims. (Cl. 336—213)

This invention relates to magnetic cores for stationary induction apparatus.

Three-legged magnetic cores for stationary induction apparatus are known wherein two inner, abutting, wound loops of magnetic strip material are surrounded by an outer wound loop of magnetic strip material, and magnetic ribbons interconnect the outer and inner core loops to facilitate transfer of magnetic flux between the inner and outer loops in a direction perpendicular to the plane of the laminations. Whenever a plurality of magnetic ribbons extend between the inner and outer loops to provide a ferromagnetic path therebetween, bulges and air spaces result adjacent the points where the interconnecting ribbons begin and end.

It is an object of the invention to provide a three-legged, wound strip magnetic core having a ferromagnetic path interlinking the inner and outer core loops which eliminates such prior art disadvantages as bulges in the outer core section as well as air spaces between laminations adjacent the points where the interconnecting laminations begin and end. The object and advantages of the invention will be better understood from the following description when taken in connection with the accompanying drawing and its scope will be pointed out in the appended claims.

Referring to the single figure of the accompanying drawing, I have illustrated therein an embodiment of the invention wherein two inner, closed, magnetic core loops 10 and 11 are spirally wound of magnetic strip material and disposed with winding leg sides in back-to-back, or abutting relation. Each inner loop 10 and 11 may be wound from a plurality of different width magnetic ribbons if it is desired that the final core be of cruciform cross section, but this construction is omitted in order to simplify the drawing and facilitate the understanding of the invention. The outer convolution 12 of inner loop 10 and a first group 14 of radially superimposed, interconnecting, magnetic strip laminations 15 are wrapped for a fraction of a convolution around the outer periphery of the inner loop 11. As illustrated in the drawing, group 14 comprises three magnetic strip laminations 15 each of which encompasses approximately one-half turn around the outer periphery of the abutting inner loops 10 and 11, and preferably the end 16 of outer convolution 12 and the "finish" ends 17 of interconnecting laminations 15 are progressively staggered in a peripheral direction to form an inverted-step arrangement of lamination ends. The "start" ends 18 of laminations 15 of first group 14 on the opposite side of the three-legged core are similarly progressively staggered in a circumferential direction but in a step-like arrangement of lamination ends.

The outer convolution 22 of inner loop 11 and a second group 24 of radially superimposed, interconnecting, magnetic strip laminations 25, preferably equal in number to the first group 14, are wrapped around the remaining perimeter of the abutting inner loops 10 and 11. The two groups 14 and 24, in effect, comprise a multiple-strip convolution surrounding the abutting inner loops 10 and 11 with each group comprising approximately one half turn and the ends of the groups 14 and 24 being in interfitted abutting relation. The lamination extremities 26 at the "start" end of second group 24 are progressively displaced in a circumferential direction to provide a step-like arrangement of lamination ends complementary to and interfitting with the inverted-step arrangement formed by the end 16 of outer convolution 12 and the "finish" end 17 of two of the three laminations 15 of first group 14. The end 27 of the outer lamination 22 of inner loop 11 and the extremities 28 of two laminations 25 at the "finish" end of second group 24 are progressively displaced in a circumferential direction to provide an inverted-step arrangement of lamination ends which is complementary to and interfits with the step-like arrangement at the "start" end of first group 14 to provide a smooth exterior periphery. The outer lamination 19 of first group 14 and the outer lamination 29 of the second group 24 are spirally wound in multiple in a plurality of convolutions 30 around this smooth external periphery and in surrounding relation to the inner loops 10 and 11 to form the outer wound core loop 31 surrounding the inner core loops 10 and 11.

The interfitting of the complementary ends of the two groups 14 and 24 of interconnecting laminations provides a smooth outer contour around which the radially outer laminations 19 and 29 of groups 14 and 24 are spirally wound to form the outer magnetic core loop 31 and eliminates the bulges and air spaces that occurred in prior art constructions at the points where the ribbons interconnecting the inner and outer core loops began and ended.

The entire three-legged core is then annealed to remove strains due to working of the magnetic strip during winding. Electrical coils 40, 41, and 42, including primary and secondary windings, may be wound on the finished annealed core in any suitable manner, preferably by the apparatus disclosed in U.S. Patent 2,305,999 to Steinmayer et al. The outer straight portion 44 of inner core loop 11 and the abutting straight portion 45 of outer core loop 31 pass through the window of the electrical coil 40 to form one outer core leg; the abutting back-to-back straight portions of the inner core loops 10 and 11 pass through the winding window of the electrical coil 41 to form the central core leg; and the abutting straight portion 46 of the inner core loop 10 and the abutting straight portion 47 of the outer core loop 31 pass through the winding window of the electrical coil 42 to form the other outer core leg. After the conducting windings have been finished, suitable wedges may be driven in place to hold the electrical coil assemblies firmly positioned with reference to the winding legs.

While the ends of the interconnecting laminations of each group have been shown and described as peripherally staggered, it will be appreciated that the objects of the invention can also be accomplished if the ends of the interconnecting laminations are in radial alignment. It is to be understood, therefore, that although only a specific embodiment of the invention has been shown and described for the purpose of illustration, the invention is not limited to the particular details shown, but includes all equivalent embodiments and modifications.

I claim as my invention:

1. A three-legged magnetic core comprising, in combination, first and second inner, wound, closed loops of magnetic strip material in back-to-back relation, first and second groups of interconnecting magnetic strip laminations having their respective ends in abutting relation surrounding the back-to-back inner loops and each of said groups encompassing a fraction of the outer periphery of the back-to-back inner loops, one of said groups and the outer convolution of each of said inner loops being wrapped around a fraction of the outer periphery of the other inner loop and the ends of the laminations of the other group abutting against the end of said outer convolution and also against the ends of those laminations of said one group radially inward from the outer lamination thereof, the abutting ends of the laminations of said groups and said convolutions being interfitted to provide a smooth external periphery and the radially outer laminations of said first and second groups being spirally wound in multiple in a plurality of turns around said smooth external periphery to form an outer core loop surrounding said first and second inner loops.

2. A three-legged magnetic core in accordance with claim 1 wherein the ends of the laminations of said groups are progressively staggered in a peripheral direction to provide interfitting flights of butt joints between the ends of the laminations of said first and second groups.

References Cited in the file of this patent

UNITED STATES PATENTS 2,908,880     Steinmayer _____ Oct. 13, 1959